United States Patent [19]

Lewis et al.

[11] Patent Number: 5,147,249

[45] Date of Patent: Sep. 15, 1992

[54] POWER TRANSMISSION MULTI-GROOVE SHEAVE AND METHOD OF MANUFACTURING THE SAME

[75] Inventors: Michael L. Lewis; Paul G. Kurre; George B. Day, all of Mason County; Daniel G. Fannin, Lewis County; Roland C. Thomas, Mason County, all of Ky.

[73] Assignee: Emerson Electric Co., St. Louis, Mo.

[21] Appl. No.: 749,675

[22] Filed: Aug. 26, 1991

[51] Int. Cl.$^5$ .............................. F16H 55/49
[52] U.S. Cl. .............................. 474/168; 29/892
[58] Field of Search .............................. 474/168–170, 474/174, 166; 29/892–893

[56] References Cited

U.S. PATENT DOCUMENTS

| | | | |
|---|---|---|---|
| 2,471,969 | 5/1949 | Meyer | 474/167 X |
| 2,841,020 | 7/1958 | Deventer, IV | 474/168 X |
| 3,186,247 | 6/1965 | Burrell | 474/174 |
| 4,767,387 | 8/1988 | Matsuoka et al. | 474/168 |

Primary Examiner—Thuy M. Bui
Attorney, Agent, or Firm—Polster, Lieder, Woodruff & Lucchesi

[57] ABSTRACT

A power transmission multi-groove sheave and method of manufacturing such sheave wherein each of the grooves of the multi-groove sheave incorporate critical dimensions to make it adaptable for use with any of several commercially known multi-groove sheaves and belt sets therefor, the multi-groove sheaves having differing proximal critical dimensions including those relating to the side wall angles of slope, the top and bottom widths, the normal depths, and the spacing between width centers of adjacent grooves.

15 Claims, 1 Drawing Sheet

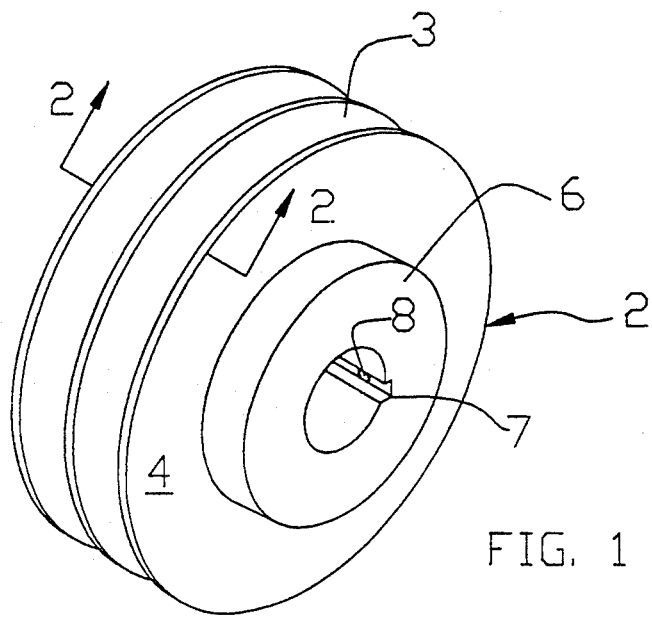
FIG. 1
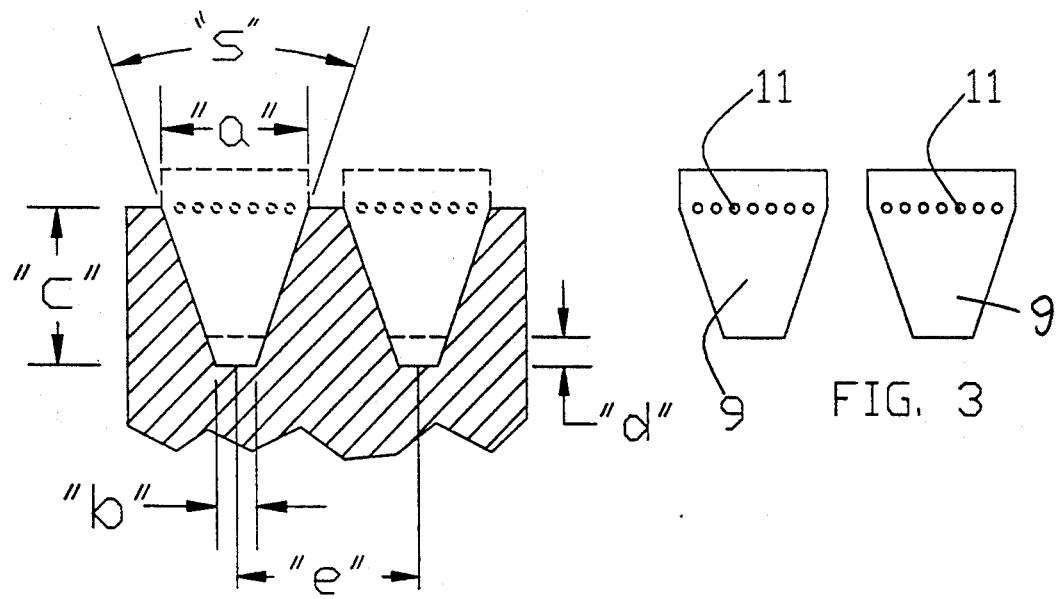
FIG. 2
FIG. 3

POWER TRANSMISSION MULTI-GROOVE SHEAVE AND METHOD OF MANUFACTURING THE SAME

BACKGROUND OF THE INVENTION

The present invention relates to belt associated power transmission apparatus and more particularly to an improved power transmission sheave of the multi-grooved rim type capable of association with any one of several preselected types of multi-groove sheaves having a like number of grooves and a method of manufacturing such an improved sheave.

Various types of multi-grooved metal sheaves of cast iron, die cast, and formed steel are known in the power transmission art, these different multi-groove sheave types each having different properties for different power transmission functions with each multi-groove sheave type having specific types of belt sets to be associated therewith in a power transmission assembly. Among the several differing physical properties of the varying multi-groove sheave types are the material used, the hub and bushing associated with the sheave, the sheave diameter size, the angle of slope of the grooved side wall of each groove in the sheave, the top and bottom widths of each groove, the depth of each groove, the spacing between the center lines extending through the bottom widths of adjacent grooves and the number of grooves involved. These properties have been important factors in arriving at the different and numerous commercial multi-groove sheave types, including such well known multi-groove sheaves commonly known in the power transmission industry as the "A", "B", "5V", "A/B Combination" and the "SPB" multi-groove sheaves, each of which types is associated with an endless power transmission belt set of a specific type. As will be discussed more fully hereinafter, these several multi-groove sheave types, as well as the particular endless belt set associated therewith, differ from each other in their above discussed physical properties. Accordingly, it has been common practice to select a specifically designs multi-groove sheave and a set of endless belts for association with each such multi-groove sheave type and to insure that both drive and driven multi-groove sheaves are of a compatible, similar type. It has been generally recognized that departure from such practices in the past could lead to undesirable problems in power transmission efficiencies and to power losses, poor belt set performance, poor belt set body and belt set cord wear and undesirable belt set groove bottoming with some of the associated undesirable problems aforediscussed concomitant with such undesirable belt set bottoming.

The present invention, recognizing the past undesirable problems associated with proper multi-groove sheave and belt set selection from the many types of belt sets and multi-groove sheaves commercially available and also recognizing the undesirable problems associated with the comparatively extensive stocking and possible improper belt set and multi-groove sheave matching, provides a unique and novel multi-groove sheave structure and method of manufacturing such sheave structure which greatly simplifies multi-groove sheave stocking and selection, assuring commonality and compatibility of usage with any one of the several above recited types of multi-groove sheaves and the previously associated belt sets therefor, over a broad horsepower range without incurring the above discussed undesirable problems which could arise through possible mismatch. In addition, the present invention provides a unique multi-groove sheave which allows for greatly increased belt set life without belt set bottoming and with increased heat dissipation between belt set and multi-groove sheave. Moreover, the present invention recognizes and resolves a need for providing a multi-groove sheave type which includes recognized critical properties accompanied by increased top groove width and increased groove depth in the grooves of the set, a preselected angle of groove wall slope, preselected top and bottom groove widths and a preselected spacing of adjacent grooves of the set. These recognized properties serve to allow the usage of any one of several belt sets specifically selected for multi-groove sheaves of varying preselected types, each of which sheave types is generally well known for use in the power transmission art in a comparatively more restricted environment. Further, the present invention provides a unique multi-groove sheave with preselected spacing between the centers of adjacent bottom groove widths to enhance efficient multi-groove sheave operation with comparatively minimum misalignment of the belt sets between drive and driven multi-groove sheaves.

BRIEF SUMMARY OF THE INVENTION

More specifically, the present invention provides an improved multi-groove sheave assembly having at least two side-by-side sheave grooves with centers of adjoining groove bottom widths spaced apart a preselected distance, the multi-groove sheave being adaptable to any one of a plurality of commercially available preselected multi-groove sheaves with a like number of grooves and to any one of select specific V-belt sets, each belt set being specifically associated with at least one of the commercially available preselected multi-groove sheaves including the multi-groove sheaves commonly used and commercially available multi-groove sheaves designated as types "A", "B", "5V", "A/B Combination", and "SPB" sheaves, with each of such commercially available and designated multi-groove sheaves having a set of at least two like grooves with the grooves of each set having differing angles of groove wall slope, differing groove top and differing groove bottom widths and differing groove depths measured normally between top and bottom groove widths comprising: a multi-groove sheave having a set of at least two side-by-side like adjacent grooves, each of the side-by-side adjacent grooves of the set having dimensions including a side wall angle of slope range from the top of the groove wall to bottom of the groove wall of 34° to 42°, a top groove width range measuring from 0.619 inches to 0.656 inches, a bottom groove width range of 0.139 to 0.231 inches with centers of adjoining groove bottom widths being spaced apart from 0.600 inches to 0.775 inches and, a minimum groove depth measured normally from top to bottom groove widths of 0.645 inches. In addition, the present invention provides a method of making an intermutual belt set receiving multi-groove sheave adaptable for usage with a number of preselected types of known multi-groove sheaves and any one set of specific selected endless belt sets, each associated with one of the known multi-groove sheaves for power transmission comprising: preselecting a number of multi-groove sheaves commonly utilized in power transmission having different proximal multi-sheave critical groove dimensions including groove side wall angles of slope measured from groove top to groove bottom, different proximal top and bottom groove widths and different spaced centers of adjoining groove bottom widths; determining the critical dimensions for the intermutual belt set receiving multi-groove sheaves by a mean mathematical averaging and empirical formulation of each of such above different critical groove dimensions of the preselected known multi-groove sheaves; and, forming the intermutual belt set receiving multi-groove sheave from a selected material to incorporate the determined critical groove dimensions. In addition, the present invention further includes novel steps to insure top width groove engagement of the upper portion of each belt of a belt set adjacent the belt core and to insure that the belt bottom face of each belt of the belt set is preselectively spaced above the bottom width face of the associated groove during power operations.

It is to be understood that various changes can be made by one skilled in the art in one or more of the several parts of the apparatus disclosed herein and in one or more of the several steps of the method disclosed herein without departing from the scope or spirit of the present invention.

BRIEF DESCRIPTION OF THE DRAWING

Referring to the drawing which discloses one advantageous embodiment of the present invention:

FIG. 1 is a perspective view of a typical multi-groove sheave including two side-by-side spaced apart grooves incorporating the critical dimensions of the present invention.

FIG. 2 is an enlarged cross-sectional view of a portion of the two grooves of the multi-groove sheave of FIG. 1 taken in a plane through line 2—2 of FIG. 1, disclosing by alphabetical symbols five of the critical dimensions contemplated by the present invention with a set of specifically selected belts and their cords being shown in phantom with the faces of the belt bottoms spaced from the faces of the bottom widths of the grooves; and, FIG. 3 is a cross-sectional view of a typical set of specifically selected endless belts which can be associated with the spaced grooves of FIG. 2, the cross-sectional view being so positioned with respect to the spaced cross-sectional grooves of FIG. 2 to further illustrate the desired operating positioning of the belts within the grooves.

DETAILED DESCRIPTION OF THE DRAWING

As can be seen in FIG. 1 of the drawings, a typical multi-groove sheave 2 including two spaced grooves is disclosed which can incorporate the recognized novel critical dimensions of the present invention. Sheave 2 includes a multi-groove rim portion 3, a body portion 4, which can be of solid disc, ribbed or spidered form, and a centrally disposed internally keyed hub portion 6 which includes a spline receiving internal keyway 7 to receive the key or spline associated with a drive or driven shaft (not shown) and a set screw 8 to lock the multi-groove sheave from sliding movement along the shaft to which the sheave is keyed. Sheave 2 can be formed in any one of several known ways including different forms of casting, such as sand casting or molding and can be of a suitable material such as cast iron, steel, powdered metal or can even be of a suitable, wear resistant, tough, plastic compound.

Referring to FIG. 2 of the drawing, it can be seen that this figure discloses an enlarged cross-section of the groove set rim portion of sheave 2 of FIG. 1 including two spaced apart grooves, each groove being of like dimensions. The inventively recognized dimensions from which the novel critical dimensions of the multi-groove sheave of the present invention are designated in FIG. 2 by alphabetic reference symbols, five such symbols being shown on one of the two disclosed grooves, since grooves of the same multi-groove sheave are alike as to these four dimensions, namely the "s", "a", "b", "c" and "e" critical dimensions. The symbol "s" designates the angle of groove side wall slope for each groove of an inventive multi-groove sheave. The symbol "a" designates the top or uppermost width for each groove of an inventive sheave. The symbol "b" designates the bottom or lowermost width for each such groove. The symbol "c" designates the distance normally from the top to bottom widths or the depth of each such groove. It is to be noted that the disclosed symbol "d" represents the spacing distance between the bottom face of a belt selected for a groove and the face of the bottom width of such groove.

The symbol "e", which also is a critical dimension, represents the distance between the centers of the bottom widths of the two adjacent grooves or, in other words, the critical spacing apart of the grooves of a multi-groove sheave.

In keeping with the present invention relating to multi-groove sheaves, the four dimensions "s", "a", "b" and "c" have been recognized as not only being critical for a novel single groove sheave, such as the "A", "B", "5V", "4L" and "5L" as set forth in the pending parent application abovenoted, but also are critical along with the dimension represented by the symbol "e" in arriving at a multi-groove sheave that can be utilized satisfactorily in place of or compatible with any one of the several recognized multi-groove sheaves known and commonly referred to in the art as the "A", "B", "5V", "A/B Combination" and the "SPB" and any of their appropriately, previous accompanying sets of endless belts, specifically designated for use with each such commonly referred to multi-groove sheaves.

As set forth in the parent application of which this patent application is a continuation-in-part, each of certain commonly known, select single groove sheaves, designated "A", "B", "5V", "4L" and "5L" usefully serve as a basis for arriving at four of the five critical dimensions, which are represented by the symbols "s", "a", "b", and "c" for a single groove sheave which could be used satisfactorily with or in place of any one of the single groove sheaves "A", "B", "5V", "4L", and "5L" and the specifically selected endless belts associated therewith. It has been recognized that this commonly used group of known single groove sheaves shared different but yet proximal dimensions recognized to be critical in arriving at the novel and critical dimensional ranges of the single groove sheave and, in accordance with the present invention, it is recognized that such arrived at novel and critical dimensions for the novel single groove sheave can also be employed as part, namely four of the five critical dimensions for the novel multi-groove sheave which can be used satisfactorily with or in place of any one of the multi-groove sheaves, "A", "B", "5V", "A/B Combination" and "SPB".

To more fully comprehend and appreciate the critical and novel nature of the recognized four significant critical dimensions of the preselected group of five select single groove sheaves, such dimensions for "A", "B", "5V", "A/B Combination" and "SPB" are set forth below in matrix form along with the arrived at four critical broad and preferred ranges of the inventive groove for the single groove sheave which are recognized in accordance with the present invention as having utility for grooves of a multi-groove sheave utilized satisfactorily or in place of multi-groove sheaves "A", "B", "5V", "A/B Combination" and "SPB" and the sets of select belts associated therewith. The alphabetical symbols "s", "a", "b" and "c" indicate four of the five critical dimensions in degrees and inches for the single groove sheaves, the symbols "$I^B$" and "$I^P$" indicating the sheave dimensions useable for both the parent application single groove sheave "A", "B", "5V" and for each groove of the present inventive multi-groove sheave. $I^B$ designates the broad accepted range of the four dimensions for the inventive single groove and multi-groove sheaves. $I^P$ designates the preferred range of the four dimensions for the inventive single groove and multi-groove sheaves, the certain selected commercial single groove dimensions are, as above discussed, designated "A", "B" and "5V", as well as the "A/B Combination" and the "SPB".

inches, but this spacing measurement can vary in accordance with the specific dimensions of the grooves and the particular belt sets associated therewith. It has been found important that the faces of the belt set bottoms be in spaced relation from the faces of the groove bottom widths and that the intermediate plane of the belt cores 11 be positioned adjacent the top corners of the grooves which, along with the bottom corners, can advantageously be rounded with a 1/32 inch radius.

In arriving at the fifth critical dimension represented by symbol "e", namely the distance the centers of adjacent bottom groove widths should be spaced apart, a minimum center distance based on the number of grooves in the inventive multi-groove sheave to allow a maximum groove misalignment of $\frac{1}{4}°$ has been established when the inventive multi-groove sheave is associated with a like multi-groove sheave or with one of the preselected known multi-groove sheaves, "A/B Combination" and "SPB", assuming that the first grooves of the associated multi-groove sheaves are accurately aligned.

The dimension range for the distance measurement, "e", both broad range and preferred range has been established through arithmetical and mean averaging along with empirical formulation by reflection on such

| Dimension | $I^B$ (range) | $I^P$ | "A" | "B" | "5V" | A/B Combination | SPB |
|---|---|---|---|---|---|---|---|
| "s" slope | 34°–42° | 37°–39 | 33.67°–38.33° | 33.67°–38.33° | 37.75°–42.25° | 33.67°–38.33° | 34°–38° |
| "a" t. width | 0.619–0.656 | 0.625–0.656 | 0.489–0.509 | 0.631–0.656 | 0.595–0.605 | 0.606–0.631 | 0.635–0.646 |
| "b" b. width | 0.139–0.231 | 0.174–0.197 | 0.169–0.231 | 0.249–0.323 | 0.139–0.202 | 0.180–0.261 | 0.161–0.225 |
| "c" depth (minimum) | 0.645 Min. | 0.655 Min. | 0.460 Min. | 0.550 Min. | 0.590 Min. | 0.612 Min. | 0.689 Min. |

The critical four dimension ranges set forth above as "s", "a", "b" and "c" for the selected commercial multi-groove sheave dimensions designated "A", "B", "5V", "A/B Combination" and "SPB" having a pitch diameter measuring from a minimal number of at least two inches up to at least twenty-eight inches (28") with the inventive sheave applying to sheaves of at least similar pitch diameter range (and possibly even a broader range) and falling within the critical broad dimensional ranges determined in accordance with the invention, and as stated under "$I^B$" and preferably or advantageously falling with the critical preferred dimensional distances extracted from a matrix which includes the fifth critical dimension of critical distance between groove bottom width centers as represented by the symbol "e" above discussed. This matrix includes this critical dimension between adjacent grooves for known multi-groove sheaves and includes such dimensional range for the known multi-groove sheaves designated in the below matrix as "A", "B", "5V", "A/B Combination" and "SPB". $I^B$ designates the broad accepted range of this critical dimension "e" and $I^P$ designates the preferred range for this critical dimension represented by symbol "e".

| Dimension | $I^B$ (range) | $I^P$ (range) | "A" | "B" | "5V" | A/B Combination | SPB |
|---|---|---|---|---|---|---|---|
| "e"-groove | 0.600–0.775 | 0.704–0.734 | 0.600–0.650 | 0.725–0.775 | 0.673–0.703 | 0.725–0.775 | 0.732–0.764 | ranges determined in accordance with the invention and as stated under "$I^P$". The critical dimensional inventive ranges set forth above were determined through mathematical calculations based on the known critical dimensional ranges for the known sheave types "A", "B", "5V", "A/B Combination" and "SPB" as set forth in the above table, utilizing mean and arithmetical averaging supplemented by empirical formulation from data gathered from numerous tests data conducted with experimental sheaves. It is to be noted that, in accordance with the parent application and the present invention, there is a clearance "d" between the bottom of the groove and the bottom of a specifically selected belt set 9 associated therewith, which belt set 9 can be anyone of the specific belt sets normally associated with the certain commonly used multi-groove sheaves, in "A", "B", "5V", "A/B Combination" and "SPB". Advantageously, this clearance will be a minimum of 0.175

These immediately above critical dimensions for symbol "e" are applicable also to multi-groove sheaves of a diameter from at least two inches (2") up to at least twenty-eight (28") and possibly as great as sixty inches (60") or even greater depending upon manufacturing capability. In this regard, it should be noted that the minimum distance between multi-groove centers for these inventive multi-groove sheaves when associated in power transmission arrangements with multi-groove sheaves of the common group "A", "B", "5V", "A/B Combination" and "SPB" or with another multi-groove sheave of like type, with each of the sheaves having the same number of grooves in each sheave, be carefully arranged to insure that the first grooves in each of the two associated multi-groove sheaves are carefully aligned and that such spacing allows for a maximum misalignment of respective grooves to be not in excess of one half of one degree.

Thus, in accordance with the present invention a novel multi-groove sheave and method of making the same is provided with a multi-groove sheave having a set of recognized critical dimensions that allows the inventive multi-groove sheave to be substituted or used in association with anyone of a certain select group of multi-groove sheaves each having different, yet proximal sets of critical dimensions compatible with the inventive multi-groove sheave, the novel multi-groove sheave having an extended operating life and efficient operating performance characteristics.

The invention claimed is:

1. An improved multi-groove sheave assembly having at least two side-by-side sheave grooves with centers of groove bottom widths spaced apart a preselected distance, said multi-groove sheave being adaptable to any one of a plurality of commercially available preselected multi-groove sheaves with a like number of grooves and to any one of select, specific V-belt sets, each belt set being specifically associated with at least one of said commercially available preselected multi-groove sheaves including the multi-groove sheaves commonly used and commercially available multi-groove sheaves designated as types "A", "B", "5V", "A/B Combination" and "SPB" with each of said commercially available and designated multi-groove sheaves having a set of similar grooves with the grooves of the sets having differing angles of groove wall slope, differing groove top and differing groove bottom widths and differing groove depths measure normally between top and bottom groove widths comprising: a multi-groove sheave having a set of at least two side-by-side adjacent grooves, each of said side-by-side adjacent grooves of said set having dimensions including a side wall angle of slope range from the top of said groove wall to the bottom of said groove wall of 34° to 42°, a top groove width range measuring from 0.619 inches to 0.656 inches, a bottom groove width range of 0.139 to 0.231 inches with centers of adjoining groove bottom widths being spaced apart from 0.600 to 0.755 inches and a minimum groove depth measured normally from top to bottom groove widths from 0.645 inches.

2. The improved multi-groove sheave of claim 1, said groove advantageously having critical dimensional ranges including a side angle of slope range from the top of the groove of the sheave to the bottom of the groove of the sheave in a range of 37.00° to 39.00°, a top groove width in a range of 0.625 to 0.656 inches, a bottom groove width in a range of 0.174 to 0.197 inches and a adjoining groove bottom widths being spaced apart from 0.704 to 0.734 inches.

3. The improved multi-groove sheave of claim 1, said sheave being of cast iron.

4. The improved multi-groove sheave of claim 1, said sheave being of steel.

5. The improved multi-groove sheave of claim 1, said sheave being of powdered metal.

6. The improved multi-groove sheave of claim 1, said sheave being a plastic compound.

7. The improved multi-groove sheave of claim 1, each of said grooves being of sufficient depth wherein any one of said select specific V-belts received thereby, has said belt bottom face spaced from the face of the bottom of said groove with the cord belt falling within a plane passing through the top width of said groove.

8. The improved multi-groove sheave of claim 7, wherein each of said V-belts received by said grooves has said belt bottom face spaced from the bottom face of said groove, a minimum of 0.175 inches.

9. The improved multi-groove sheave of claim 1, said sheave having a pitch diameter in a range of approximately two (2) to at least twenty-eight (28) inches.

10. A method of making an intermutual belt receiving multi-groove sheave adaptable for usage with a number of preselected types of known multi-groove sheaves and any one set of specifically selected endless belt sets, each associated with said known multi-groove sheaves for power transmission comprising: preselecting a number of multi-groove sheaves commonly utilized in power transmission having different proximal multi-sheave critical groove dimensions including groove side wall angles of slope measured from groove uppermost top to lowermost groove bottom, different proximal uppermost top and lowermost groove bottom, different proximal uppermost top and lowermost bottom groove widths and different, proximally spaced centers of adjoining groove bottom widths; determining the critical dimensions of the intermutual belt set receiving multi-groove sheaves by a mathematical averaging of each of such above different critical groove dimensions of said preselected known multi-groove sheaves; and, forming said intermutual belt set receiving multi-groove sheave from a selected material to incorporate said determined critical groove dimensions.

11. The met hod of making an intermutual grooved belt receiving multi-groove sheave of claim 10, including incorporating in the top groove width critical dimensions for each groove an appropriate dimensional allowance to insure that the cord portion of drive belts to be used therewith, engage the groove adjacent the top width of said groove.

12. The method of making an intermutual belt receiving multi-groove sheave of claim 10, including incorporating in the normal groove depth critical dimension for each groove an appropriate dimensional allowance to insure that the bottom face of selected drive belts to be used therewith are preselectively spaced above the bottom width face of said groove.

13. The method of making an intermutual belt receiving multi-groove sheave of claim 10, including incorporating in the top horizontal groove width critical dimension for each groove an appropriate dimensional allowance to insure that the cord portion of said select drive belts to be used with said preselected sheaves engage each of the grooves adjacent the top width of said groove and incorporating an appropriate dimensional allowance to insure that the bottom face of each of said select drive belts are preselectively spaced above the bottom width face of each of said grooves.

14. The method of making an intermutual grooved belt receiving multi-groove sheave of claim 10, wherein said sheave is formed by metal casting.

15. The method of claim 14, said casting step being sand casting.

* * * * *

UNITED STATES PATENT AND TRADEMARK OFFICE
CERTIFICATE OF CORRECTION

PATENT NO. : 5,147,249

DATED : September 15, 1992

INVENTOR(S) : Lewis et al.

It is certified that error appears in the above-indentified patent and that said Letters Patent is hereby corrected as shown below:

```
Column 7, line 52, before "adjoining" insert -- minumum
normal groove depth of 0.655 inches with centers of --.
```

Signed and Sealed this

Twenty-third Day of August, 1994

Attest:

BRUCE LEHMAN

Attesting Officer

Commissioner of Patents and Trademarks